United States Patent
Fork et al.

(10) Patent No.: US 8,811,797 B2
(45) Date of Patent: Aug. 19, 2014

(54) SWITCHING BETWEEN TIME ORDER AND POPULARITY ORDER SENDING OF VIDEO SEGMENTS

(75) Inventors: Michael J. Fork, Gibsonburg, OH (US); Chris M. Mwarabu, Cary, NC (US); Kevin G. Paterson, San Antonio, TX (US); Theodore J. L. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 13/517,709

(22) Filed: Jun. 14, 2012

(65) Prior Publication Data

US 2013/0336638 A1  Dec. 19, 2013

(51) Int. Cl.
*H04N 9/80* (2006.01)
*H04N 5/93* (2006.01)
(52) U.S. Cl.
USPC ............................ 386/248; 386/239; 386/353
(58) Field of Classification Search
USPC .................. 386/239–248, 343–352, 353–357
See application file for complete search history.

(56) References Cited

U.S. PATENT DOCUMENTS

| | | | |
|---|---|---|---|
| 5,615,018 A | 3/1997 | Wu et al. | |
| 6,993,787 B1 * | 1/2006 | Kamel et al. | 725/94 |
| 7,152,209 B2 * | 12/2006 | Jojic et al. | 715/720 |
| 7,646,960 B2 | 1/2010 | Garbow et al. | |
| 2003/0123844 A1 * | 7/2003 | Toma et al. | 386/46 |
| 2006/0036783 A1 | 2/2006 | Aarts | |
| 2007/0255844 A1 * | 11/2007 | Shen et al. | 709/231 |
| 2008/0235583 A1 | 9/2008 | Ostergaard et al. | |
| 2010/0061553 A1 * | 3/2010 | Chaum | 380/200 |

OTHER PUBLICATIONS

Akio Takashima et al., Sharing Video Browsing Style by Associating Browsing Behavior with Low-level Features of Videos, pp. 1-9, 2007.

* cited by examiner

*Primary Examiner* — Hung Dang
(74) *Attorney, Agent, or Firm* — Owen J. Gamon; Mattew J. Bussan

(57) ABSTRACT

In an embodiment, if a number of segments of a video in a buffer after a buffer position is less than a play threshold, then a first plurality of segments is sent into the buffer in time order; and if the number of the segments in the buffer at the buffer position is not less than the play threshold, a second plurality of segments is sent to the buffer in popularity order, wherein the second plurality of segments are stored into the buffer in time order.

15 Claims, 9 Drawing Sheets

PRE-FETCH PROFILE

| NETWORK BANDWIDTH | TIME-ORDER RESOLUTION | POPULARITY RESOLUTION | MIN POPULARITY SCORE | |
|---|---|---|---|---|
| HIGH | HIGH | HIGH | 25 | 402 |
| HIGH | MEDIUM | MEDIUM | 50 | 404 |
| HIGH | LOW | LOW | 75 | 406 |
| MEDIUM | HIGH | MEDIUM | 60 | 408 |
| MEDIUM | MEDIUM | MEDIUM | 75 | 410 |
| MEDIUM | LOW | LOW | 90 | 412 |
| LOW | HIGH | LOW | 70 | 414 |
| LOW | MEDIUM | LOW | 80 | 416 |
| LOW | LOW | LOW | 90 | 418 |

PRE-FETCH PROFILE 178

| NETWORK BANDWIDTH | TIME-ORDER RESOLUTION | POPULARITY RESOLUTION | MIN POPULARITY SCORE | |
|---|---|---|---|---|
| HIGH | HIGH | HIGH | 25 | 402 |
| HIGH | MEDIUM | MEDIUM | 50 | 404 |
| HIGH | LOW | LOW | 75 | 406 |
| MEDIUM | HIGH | MEDIUM | 60 | 408 |
| MEDIUM | MEDIUM | MEDIUM | 75 | 410 |
| MEDIUM | LOW | LOW | 90 | 412 |
| LOW | HIGH | LOW | 70 | 414 |
| LOW | MEDIUM | LOW | 80 | 416 |
| LOW | LOW | LOW | 90 | 418 |

FIG. 4

SWITCHING BETWEEN TIME ORDER AND POPULARITY ORDER SENDING OF VIDEO SEGMENTS

FIELD

An embodiment of the invention generally relates to video and more particularly to switching between time order and popularity order sending of video segments from a server to a client.

BACKGROUND

Video technology involves electronically recording, storing, transmitting, and playing or displaying a sequence of still images called frames, in a time order sequence, in order to give the appearance of scenes in motion.

A digital video frame is represented using a grid of square, rectangular, circular, or non-uniform pixels. Each pixel is a sample of an original image, and a pixel (also known as a pel or picture element) is a single point in a raster image, the smallest addressable screen element, or the smallest unit of an image that is possible to be represented and controlled. Each pixel has a unique address, represented as coordinates on a two-dimensional grid. The intensity of each pixel may be variable.

The number of pixels or the density of pixels in a frame is called the resolution. In general, the larger the density of pixels (the higher the resolution), the sharper the image, and the more accurate the representation of the original image. The resolution may be expressed as a number of pixels per unit distance or area, such as the number of pixels per square inch.

Over the years, the technology of video display has progressed from television sets that receive broadcast signals, to cable television, to satellite television, to on-demanded video streamed over a network and displayed on a client, such as a television set, computer display, or telephone. Previously, video display was restricted to passively displaying the content that was broadcast from a sender to the television. But, today, on-demand video allows the viewer to selectively pause, rewind, or fast-forward the video. The client often pre-fetches (and the server sends) portions of the video, prior to the time that the video is played, in order to provide a sufficient amount of content available for immediate viewing. The client often does not pre-fetch, and the server does not send, the entire video prior to the start of viewing because of client memory constraints, network bandwidth constraints, and/or the desire of the content owner not to provide a complete copy of the video.

SUMMARY

A method, computer-readable storage medium, and computer are provided. In an embodiment, if a number of segments of a video in a buffer after a buffer position is less than a play threshold, then a first plurality of segments is sent into the buffer in time order; and if the number of the segments in the buffer at the buffer position is not less than the play threshold, a second plurality of segments is sent to the buffer in popularity order, wherein the second plurality of segments are stored into the buffer in time order.

BRIEF DESCRIPTION OF THE SEVERAL VIEWS OF THE DRAWINGS

FIG. 4 depicts a block diagram of an example data structure for a pre-fetch profile, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
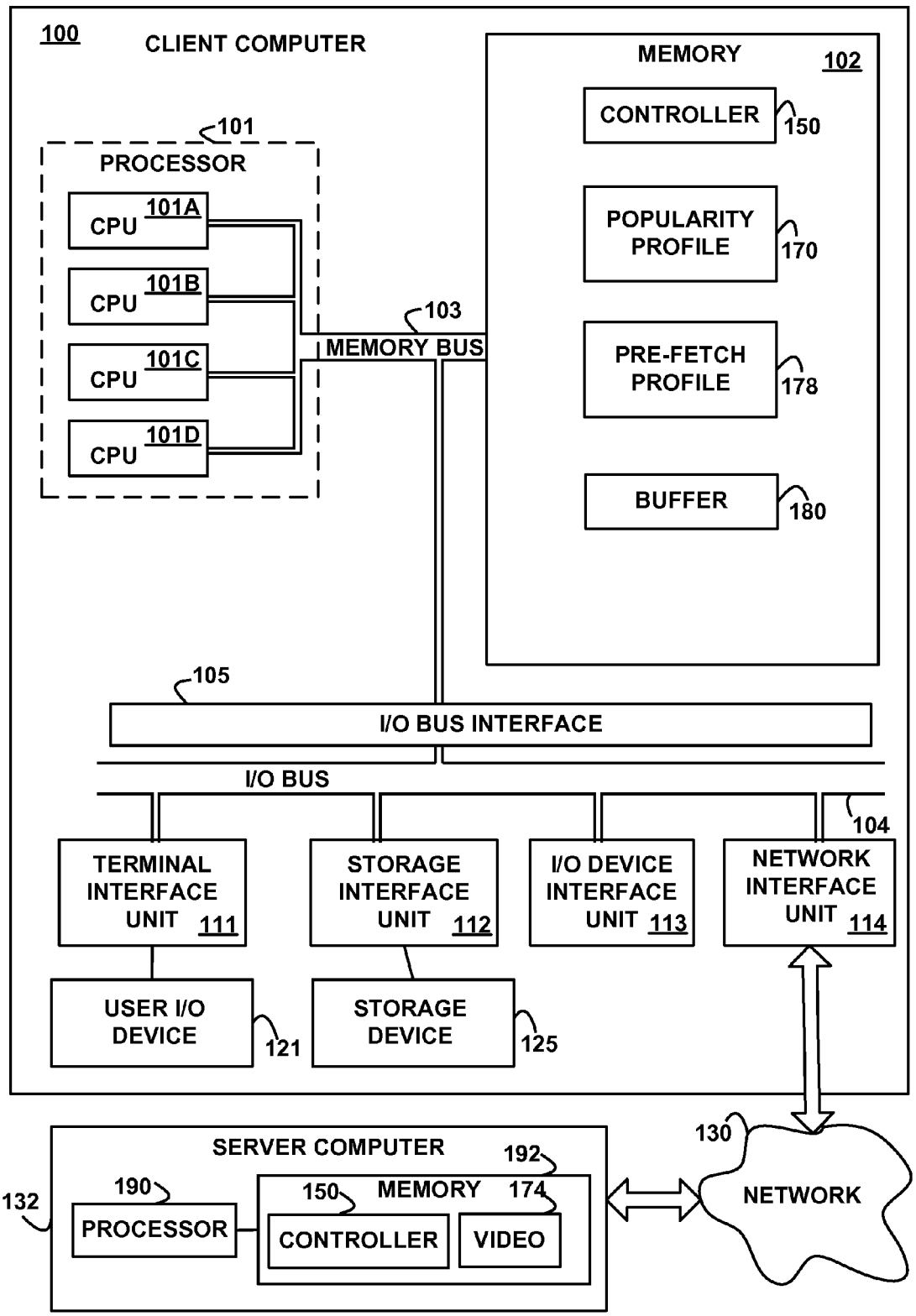
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected to a server computer system 132 via a network 130, according to an embodiment of the present invention. The terms "client" and "server" are labels used herein for convenience of exposition, and a computer system that operates as a client in an embodiment may operate as a server in another embodiment, and vice versa. The major components of the client computer system 100 comprise one or more processors 101, a memory 102, and interface units 111, 112, 113, and 114, which are communicatively coupled, directly or indirectly, for inter-component communication via a memory bus 103, an I/O (Input/Output) bus 104, and an I/O bus interface 105. The computer system 100 comprises one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a controller 150, a popularity profile 170, a pre-fetch profile 178, and a buffer 180. Although the controller 150, the popularity profile 170, the pre-fetch profile 178, and the buffer 180 are illustrated as being contained within the memory 102 in the computer system 100, in other embodiments some or all of them may be on different computer systems and may be accessed remotely, e.g., via the network 130. For example, the controller 150, the popularity profile 170, and/or the pre-fetch profile 178 may be stored in memory in the server computer 132, and the controller 150 may execute on a processor or processors of the server computer 132. The computer system 100 may use virtual addressing mechanisms that allow the programs of the computer system 100 to behave as if they only have access to a large, single storage entity instead of access to multiple, smaller storage entities. Thus, while the controller 150, the popularity profile 170, the pre-fetch profile 178, and the buffer 180 are illustrated as being contained within the memory 102, these elements are not necessarily all completely contained in the same storage device at the same time. Further, although the controller 150, the popularity profile 170, the pre-fetch profile 178, and the buffer 180 are illustrated as being separate entities, in other embodiments some of them, portions of some of them, or all of them may be packaged together.

In an embodiment, the controller 150 comprises instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, and 11. In another embodiment, the controller 150 is implemented in hardware via semiconductor devices, chips, logical gates, circuits, circuit cards, and/or other physical hardware devices in lieu of, or in addition to, a processor-based system. In an embodiment, the controller 150 comprises data in addition to instructions or statements. In various embodiments, the controller 150 is a user application, a third-party application, an operating system, or any portion, multiple, or combination thereof.

The memory bus 103 provides a data communication path for transferring data among the processor 101, the memory 102, the I/O bus 104, and the I/O bus interface 105.

The interface units 111, 112, 113, and 114 support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, keypad, microphone, camera, sensor, pointing device, or any combination or multiple thereof). In various embodiments, a pointing device may comprise a mouse, touchpad, trackball, button, light pen, wand, touch screen, hand, finger, body part, or any combination or multiple thereof. A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the computer system 100 to other digital devices and computer systems; such paths may comprise, e.g., one or more networks 130. The other computer systems in the network 130 may comprise some or all of the hardware and program components illustrated for the computer system 100.

Although the memory bus 103 is shown in FIG. 1 as a relatively simple, single bus structure providing a direct communication path among the processors 101, the memory 102, the I/O bus 104 and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and other computer systems. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The server computer system 132 may comprise some or all of the hardware and program components previously described for the client computer system 100. In particular, the server computer system 132 may comprise a processor 190 connected to memory 192 that stores a controller 150 and a video 174. The controller 150 at the server computer system 132 executes on the processor 190 at the server computer system 132. The video 174 may comprise audio and/or video segments, which the controller 150 at the server computer system 132 sends via the network 130 to the client computer system 100, where the client computer system 100 plays the received video via the user I/O device 121. In various embodiments, the controller 150 may be present and execute at the client computer system 100, the server computer system 132, or both.

FIG. 1 is intended to depict the representative major components of the client computer system 100, the network 130, and the server computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and/or 132 and that, when read and executed by one or more processors in the computer system 100 and/or 132 or when interpreted by instructions that are executed by one or more processors, cause the computer system 100 and/or 132 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figures 2, 3:
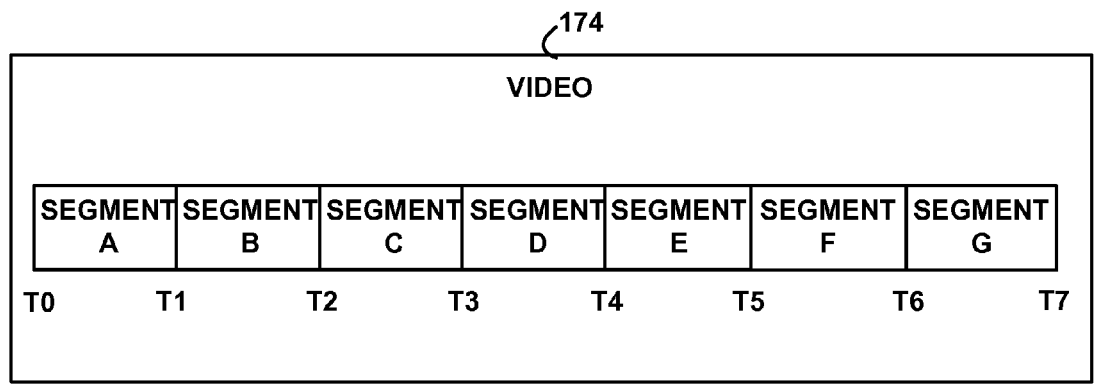
FIG. 2 depicts a block diagram of an example data structure for a video, according to an embodiment of the invention.
FIG. 3 depicts a block diagram of an example data structure for a popularity profile, according to an embodiment of the invention.

FIG. 2 depicts a block diagram of an example data structure for a video 174, according to an embodiment of the invention. The video 174 comprises any number of segments, such as the segment A, the segment B, the segment C, the segment D, the segment E, the segment F, and the segment G. The segments may represent any number of frames or any time period of frames or other presentable material within the video 174. A frame represents material that may be presented at any one time via the user I/O device 121. For example, a frame may comprise a still image, and displaying frames in succession over time creates the appearance of motion. Frames per second (FPS) is a measure of how much information is used to store and display moving video. Frames per second applies equally to film video and digital video. The more frames per second, the smoother the motion appears. Television in the United States, for example, is based on the NTSC (National Television System Committee) format, which displays thirty interlaced frames per second, but in other embodiments any number of frames per second and any appropriate format or standard for storing and presenting the video 174 may be used. Embodiments of the invention may include video only, video and audio, audio only, or still images. Examples of various standards and formats that various embodiments of the invention may use include NTSC, PAL (Phase Alternate Line), RS-170, RS-330, HDTV (High Definition Television), MPEG (Motion Picture Experts Group), DVI (Digital Video Interface), SDI (Serial Digital Interface), AIFF (Audio Interchange File Format), Au, CD-DA (Compact Disc-Digital Audio), MP3 (MPEG 1 or 2 Audio Layer III), QuickTime, RealAudio, WAV (Waveform Audio File), WMV (Windows Media Video) and PCM (Pulse Code Modulation). The segments are stored in the video 174 in the time order that the video is played in response to a play command, such as the example time T0 (the earliest or starting time of the video when played) through the example time T7 (the latest or ending time of the video when played). In an embodiment, the times are relative times; for example, if the entire video 174 is 22 minutes and 45 seconds in duration, then T0=00:00 and T7=22:45. The time order corresponds to the sequential order of addresses at which the segments exist in the video 174.

FIG. 3 depicts a block diagram of an example data structure for a popularity profile 170 for a particular video, according to an embodiment of the invention. The popularity profile 170 comprises example entries 302, 304, 306, 308, 310, 312, and 314, each of which comprises an example segment identifier field 320, and an example popularity score field 322. The example segment identifier (ID) field 320, in each entry, uniquely identifies one of the segments in the video 174. The popularity score 322, in each entry, specifies the popularity of the segment, in the same entry, as compared to or relative to the popularity of all other segments in the video 174. The popularity of a segment is based on the number of times that the segment was played, replayed, and/or jumped to, and the popularity score is altered based on whether the segment had already been pre-fetched (or sent from the server 132 to the client 100) and was available in the buffer 180 at the time it was jumped to, as further described below with reference to FIG. 10. In various embodiments, the controller 150 calculates the popularity score 322 on a per-user basis, aggregates the popularity scores 322 for all users and all (possibly different) client computers 100 that view the same video 174, or aggregates the popularity scores 322 for all users that use the same client computer 100 to view the same video 174.

FIG. 4 depicts a block diagram of an example data structure for a pre-fetch profile 178, according to an embodiment of the invention. The pre-fetch profile 178 comprises example entries 402, 404, 406, 408, 410, 412, 414, 416, and 418, each of which comprises an example network bandwidth field 420, a time-order resolution field 422, a popularity resolution field 424, and a minimum (min) popularity score field 426.

The network bandwidth field 420, in each entry, specifies a relative bandwidth or performance of the network interface unit 114 or the network 130, as compared to all other entries, where a network bandwidth of "high" signifies a greater performance than a network bandwidth of "medium," which signifies a greater performance than a network bandwidth of "low." The time-order resolution field 422 specifies the resolution at which segments of the video are pre-fetched by the client 100 or sent by the server 132 to the client 100 when the segments are pre-fetched (or sent) in time order. The popularity resolution field 424 specifies the resolution at which segments of the video are pre-fetched (or sent) when the segments are pre-fetched (or sent) in popularity order by the controller 150. The time-order resolution and the popularity resolution of "high" represent a pixel density that is greater than the resolution of "medium," which represents a pixel density that is greater than "low." The minimum popularity score field 426 specifies the minimum popularity threshold score value that a segment needs in order to be pre-fetched (or sent) by the controller 150, in popularity order. In various embodiments, the values in the pre-fetch profile 178 are received by the controller 150 from the user via the user I/O device 121, are initialized by the designer of the controller 150, or are received by the controller 150 from the server computer 132 and stored by the controller 150 into the pre-fetch profile 178. As illustrated by FIG. 4 some of the entries have values for the time-order resolution 422 and the popularity resolution 424 that are identical (e.g., the entries 402, 404, 406, 410, 412, and 418) while other entries have values that are different (e.g., the entries 408, 414, and 416).

Figure 5:
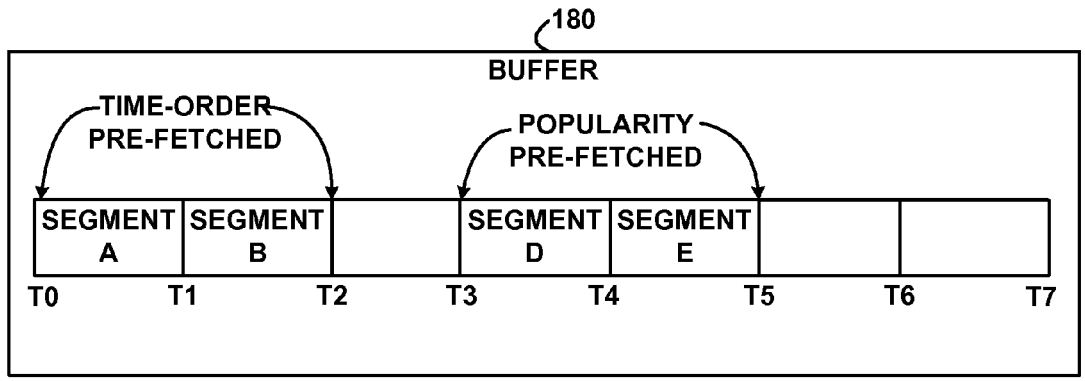
FIG. 5 depicts a block diagram of an example data structure for a buffer, according to an embodiment of the invention.

FIG. 5 depicts a block diagram of an example data structure for a buffer 180, according to an embodiment of the invention. In various embodiments, the buffer 180 may be of a size that is less than the size of the video 174, the same as the size of the video 174, or greater than the size of the video 174.

The controller 150 pre-fetched (or sent) segments A and B of the video 174 into the buffer 180 via the technique of immediate or time-order pre-fetching or sending. The example of FIG. 5 represents entry 404 in the pre-fetch profile 178 of FIG. 4 since segments C, F, and G are below the minimum score of 50. The controller 150 pre-fetched (or sent) segments D and E via the technique of popularity pre-fetching (or sending) because segments D and E have the highest popularity scores of all un-fetched segments and have popularity scores above the minimum popularity score 426.

The segments A, B, D, and E are present in the buffer 180, in time order, with the segment A starting at time T0, the segment B starting at time T1 (after time T0), the segment D starting at tine T3 (after time T2), and the segment E starting at time T4 (after time T3). No segments exist in the buffer 180, starting at the times T2 (after time T1), T5 (after time T4), and T6 (after time T5) because the controller 150 has not pre-fetched (or sent) the segments C, F, and G by either immediate time-order pre-fetching (or sending) or popularity pre-fetching (or sending), and the controller 150 has left space for the segments C, F, and G in the buffer 180, in time order. Although the controller 150 pre-fetched (or sent) the segment D and the segment E in popularity order (segment E followed by segment D since the popularity score of the segment E is greater than the popularity score of the segment D, as illustrated in FIG. 3), the controller 150 stores the segments into the buffer 180, so that they are present in the buffer 180 in time order (segment D followed by segment E since the starting time of T3 assigned to the segment D is before the starting time of T4 assigned to the segment E).

Figure 6:
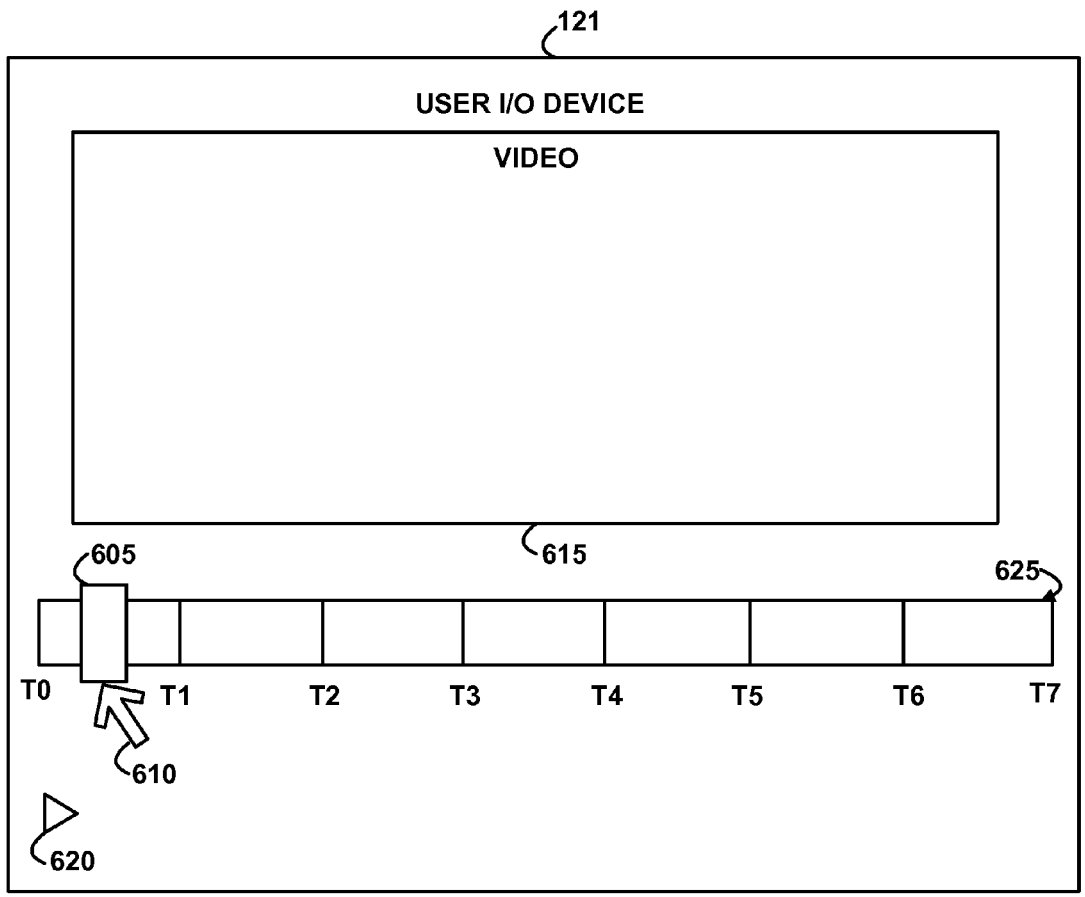
FIG. 6 depicts a block diagram of an example user I/O device, according to an embodiment of the invention.

FIG. 6 depicts a block diagram of an example user I/O device 121, according to an embodiment of the invention. FIG. 6 depicts the user I/O device 121, displaying the frames 615 from the segments of the video and a timeline 625 with a slider 605, on top of the timeline 625. The user I/O device 121 further displays a cursor (or pointer) 610 and a play button 620. The position of the slider 605 on the timeline 625 indicates the position and time of the currently displayed frame 615, from the buffer 180. Thus, as the frames change in displayed succession on the user I/O device 121, the slider 605 changes its position on the timeline 625, and vice versa. The timeline 625 represents the segments and displays the times of the segments in the time order of the segments in the video. The user may move or operate a user input device to move the cursor 610 and to select and/or drag objects displayed on the user I/O device 121, such as the slider 605, the play button 620, and various locations of the timeline 625. Selection of the play button 620 by the cursor 610, or by any other technique or combination of techniques, causes a play command to be sent to the controller 150, which, in response, starts frames of the video playing from the buffer 180 in time order, starting from the current location of the slider 605 on the timeline 625, at the time that the play button 620 was selected. Movement, or dragging, of the slider 605 by the cursor 610 causes a jump, fast forward, or reverse command to be sent to the controller 150, which causes the controller 150 to display frames of the video from the buffer 180 at the location or locations specified by the jump, fast forward, or reverse commands. In an embodiment, the jump command requests that frames be played out-of-order from the time sequence order or that frames be played at a faster frame rate than requested by a play command, either forward or backwards in time from the time indicated by the current position of the slider 605 on the timeline 625.

Figure 7:
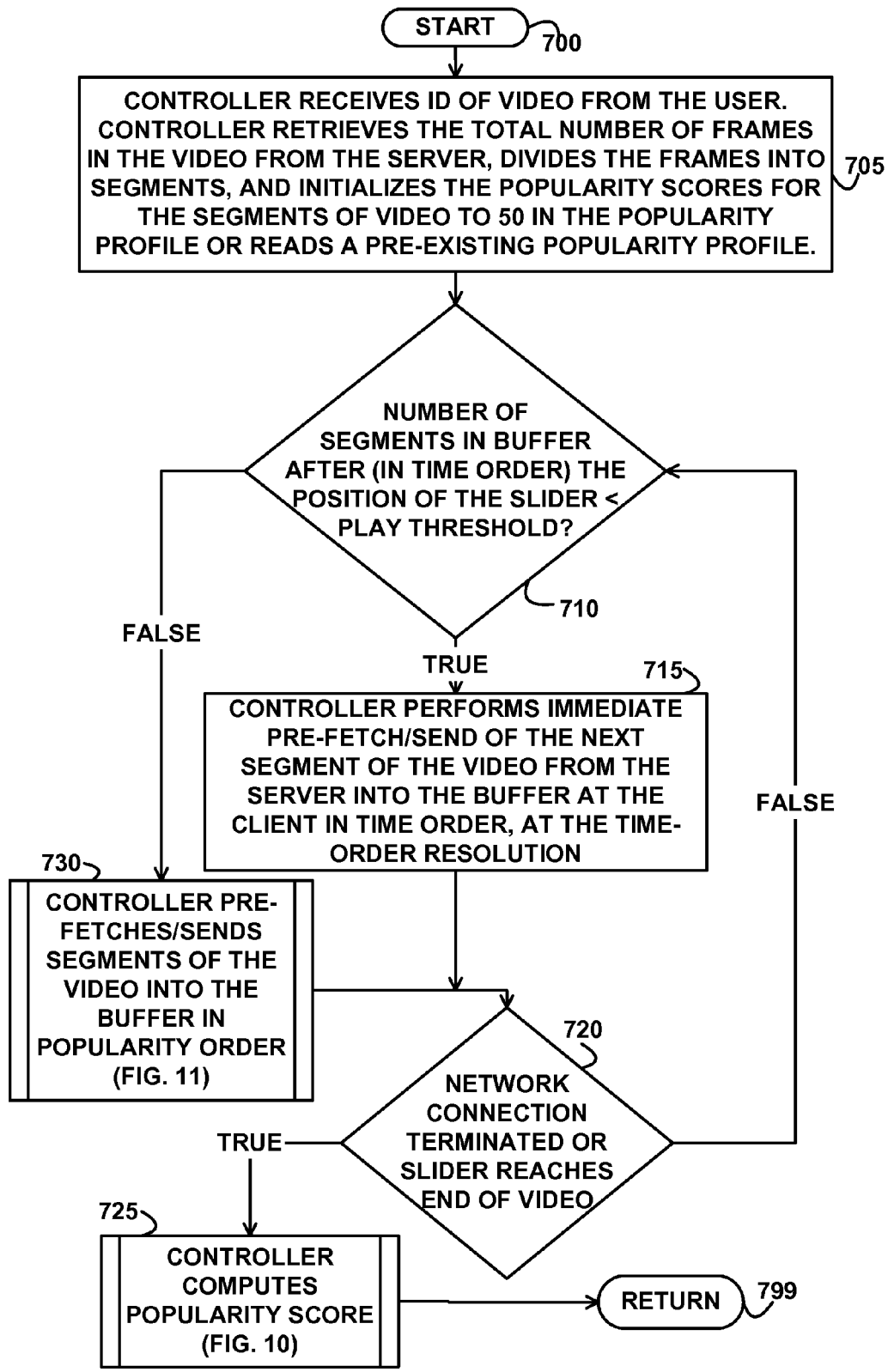
FIG. 7 depicts a flowchart of example processing for pre-fetching (or sending) video segments, according to an embodiment of the invention.

FIG. 7 depicts a flowchart of example processing for pre-fetching (or sending) video segments, according to an embodiment of the invention. Control begins at block 700. Control then continues to block 705 where the controller 150 receives a command from a user that specifies an identifier of a video 174 that the user requests to be played. In an embodiment, the identifier of the video may be a network address of the video 174 at the server computer 132. In response to the command, the controller 150 initiates a viewing session and retrieves the total number of frames in the video from the server computer 132, divides the frames into segments, and initializes the popularity scores for the segments of video to an initial value, for example "50," in the popularity profile 170. In another embodiment, the controller 150 reads a pre-existing popularity profile 170. The controller 150 further receives or reads a play or time-order resolution from the user via a command or from the server computer 132.

Control then continues to block 710 where the controller 150 determines whether the number of segments of the video 174 that are present in the buffer 180 after, in time order, the position in the buffer 180 specified by the position of the slider 605 on the timeline 625 is less than a play threshold. In various embodiments, the play threshold is set by the designer of the controller 150, received from the user via a command, or received from the server computer 132 or an application via the network 130. In an embodiment, the client computer system 100 sends the number of segments present in the buffer 180 after the position specified by the slider 605 to the server computer system 132, so that the controller 150 at the server computer system 132 may make the determination of block 710.

If the determination at block 710 is true, then the number of segments present in the buffer 180 after, in time order, the position of the slider 605 is less than the play threshold, so control continues to block 715 where the controller 150 performs an immediate or time-order pre-fetch (or send) of the next segment of the video from the server computer 132 into the buffer 180 at the client computer 100, in time order, at the time-order resolution. Using the example of FIGS. 5 and 6, if the play threshold is three segments and the slider 605 is between time T0 and time T1, then the number of segments in the buffer 180 after (in time order) the position of the slider is two (segment A and segment B), and the two segments in the buffer 180 is less than the play threshold of three, so control continues from block 710 to block 715, where the controller 150 does an immediate or time-order pre-fetch (or send) of the segment C into the buffer 180. Thus, in this example, the segment C is the next segment to be pre-fetched (or sent) into the buffer 180.

Control then continues to block 720 where the controller 150 determines whether the network connection from the client computer 100 to the server computer 132 has terminated or whether the position of slider 605 has reached the end of the timeline 625, indicating that the display of the frames of the video 174 has reached the last frame of the video (time T7 in the example of FIGS. 2 and 6). If the determination of block 720 is true, then either the network connection from the client computer 100 to the server computer 132 has terminated or the slider 605 has reached the end of the video, so control continues to block 725 where the controller 150 computes the popularity scores for the segments of the video, as further described below with reference to FIG. 10. Control then continues to block 799 where the logic of FIG. 7 returns. If the determination at block 720 is false, then the network connection has not terminated and the slider 605 has not reached the end of the video, so control returns from block 720 to block 710, as previously described above.

If the determination at block 710 is false, then the number of segments present in the buffer 180 after, in time order, the position of the slider 605 is greater than or equal to the play threshold, so control continues to block 730 where the controller 150 pre-fetches (or sends) segments of the video from the server computer 132 into the buffer 180 at the client computer 100, in popularity order, as further described below with reference to FIG. 11. Control then continues to block 720, as previously described above.

In this way, in an embodiment, the controller 150 switches back and forth between immediate or time-order pre-fetches (or sends) (to ensure that enough segments are in the buffer 180 to supply segments for a play command) and popularity pre-fetches (or sends) (to ensure that segments are in the buffer 180 to supply a jump command, in the event a jump command is received). Thus, the controller 150 performs an immediate or time-order pre-fetch (or send) of segments, in time order, during the time that the number of segments in the buffer 180 is less than the play threshold, and switches to popularity pre-fetches (or sends) during the time that the number of segments in the buffer 180 is greater than or equal to the play threshold. In an embodiment, this switching between time-order pre-fetches (or sends) and popularity pre-fetches (or sends) by the controller 150 balances the limitations of network bandwidth and memory constraints while predicting the locations in the video to which the user is likely to jump.

Figure 8:
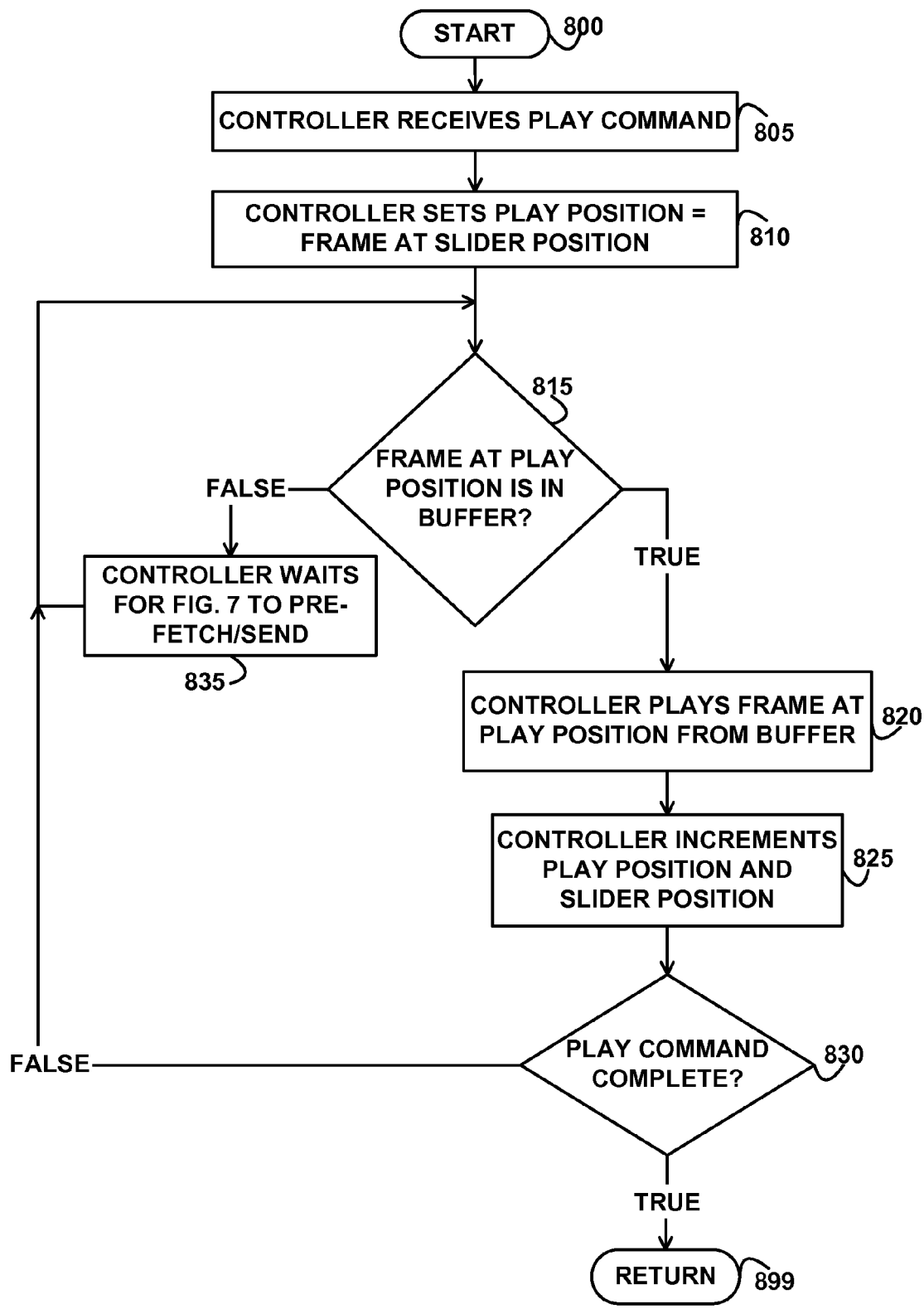
FIG. 8 depicts a flowchart of example processing for a play command, according to an embodiment of the invention.

FIG. 8 depicts a flowchart of example processing for a play command, according to an embodiment of the invention. In an embodiment, the logic of FIG. 8 executes concurrently or interleaved with the logic of FIG. 7, on the same or different processors via multi-threading, multi-tasking, multi-processing, or multi-programming techniques.

Control begins at block 800. Control then continues to block 805 where the controller 150 receives a play command, which requests that frames of the video 174 be played, starting from the frame indicated by the current position of the slider 605 on the timeline 625, in time order. Control then continues to block 810 where the controller 150 sets the play position to be the frame indicated by the current position of the slider 605 on the timeline 625. Control then continues to block 815 where the controller 150 determines whether the frame at the play position is present in the buffer 180 at the client computer 100. If the determination at block 815 is true, then the frame at the play position is present in the buffer 180 at the client computer 100, so control continues to block 820 where the controller 150 plays or displays the frame at the play position from buffer 180 on the user I/O device 121. If the frame was pre-fetched (or sent) at the time-order resolution, then the controller plays the frame at the time-order resolution. If the frame was pre-fetched (or sent) at the popularity resolution, then the controller plays the frame at the popularity resolution.

Control then continues to block 825 where the controller 150 increments the play position to the next frame, in time order, after the current frame in the buffer 180 and increments the position of the slider 605 to indicate the position of the next frame on the timeline 625. Control then continues to block 830 where the controller 150 determines whether the play command is complete, meaning whether display of the frames of the video 174 has reached the last frame of the video 174 or the user has issued a pause command, a stop command, or a jump command to the controller 150.

If the determination at block 830 is true, then the play command is complete, so control continues to block 899 where the logic of FIG. 8 returns. If the determination at block 830 is false, then the play command is not complete, so control returns to block 815, as previously described above.

If the determination at block 815 is false, then the current frame at the play position is not present in the buffer 180, so control continues to block 835 where the logic of FIG. 8 waits for the logic of FIG. 7 to pre-fetch (or send) a frame into the buffer 180. Control then returns to block 815, as previously described above.

Figure 9:
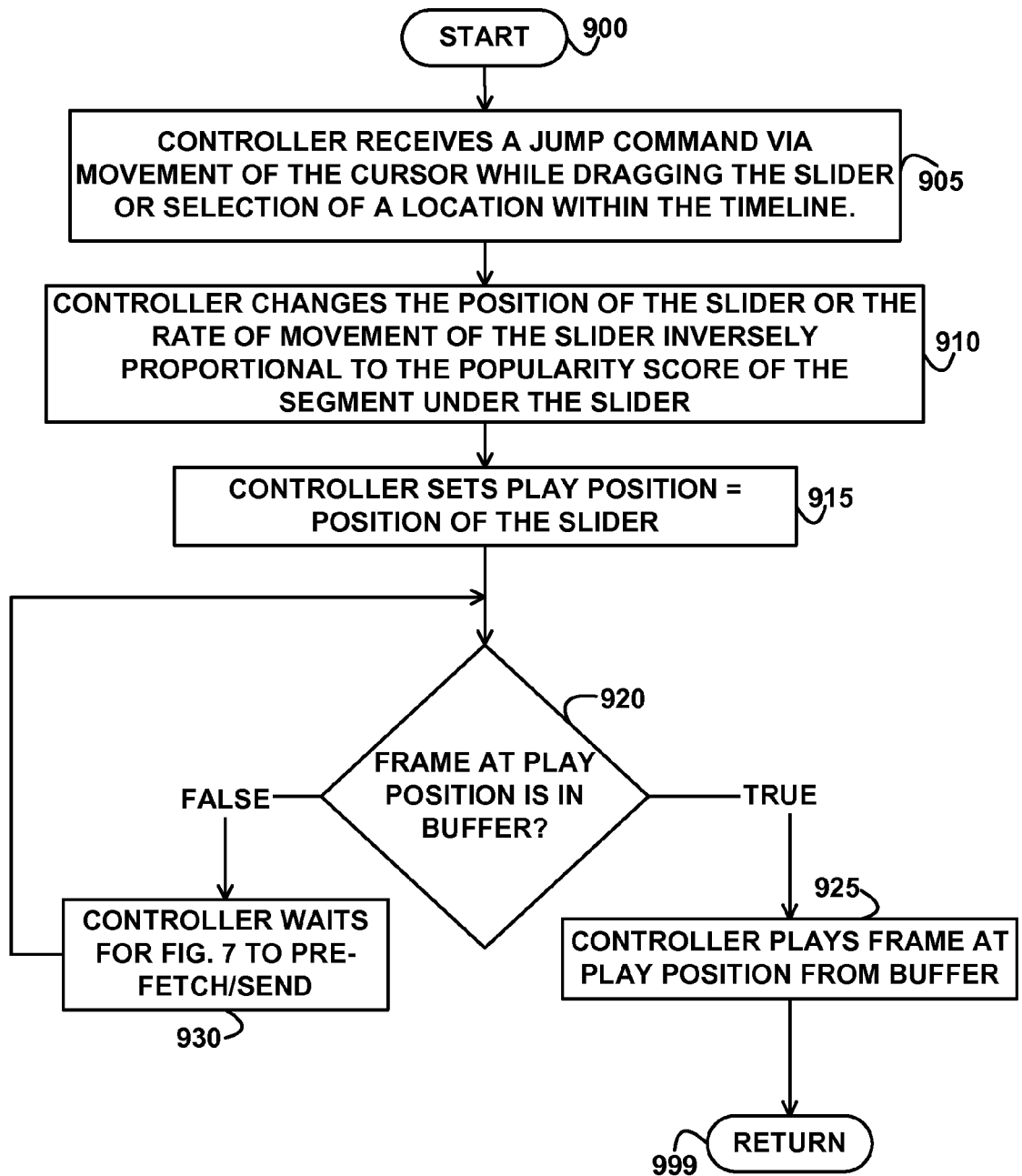
FIG. 9 depicts a flowchart of example processing for a jump command, according to an embodiment of the invention.

FIG. 9 depicts a flowchart of example processing for a jump command, according to an embodiment of the invention. In an embodiment, the logic of FIG. 9 executes concurrently or interleaved with the logic of FIG. 7, on the same or different processors via multi-threading, multi-tasking, multi-processing, or multi-programming techniques.

Control begins at block 900. Control then continues to block 905 where the controller 150 receives a jump command via movement of the cursor 610 while dragging the slider 605 or selection of a location within the timeline 625, via the user I/O device 121. In an embodiment, the controller 150 may receive multiple jump commands, as the slider 605 is dragged by the cursor 610 across the timeline 625 (either forward or backward), one for each position of the user input device, as the user input device drags the slider 605 via the cursor 610, and each jump command specifies an intermediate position of the user input device. In another embodiment, the controller 150 receives one jump command, after the user input device has stopped dragging the cursor 610 and the slider 605, and the jump command specifies the ending position of the user input device.

Control then continues to block 910 where, in response to and as a result of the jump command, the controller 150 changes the position of the slider 605 or the rate of movement of the slider 605 inversely proportional to the popularity score of the segment indicated by the position of the slider 605 if the segment indicated by the position of the slider 605 is present in the buffer 180. Thus, the controller 150 moves the slider 605 faster over segments with lower popularity scores and slower over segments with higher popularity scores, which may cause the rate of movement of the slider 605 to be different than, or not proportional to, the rate of movement of the user input device. For example, if the rate of movement of the user input device is constant, the rate of movement of the cursor 610 and the slider 605, which the cursor 610 drags, may increase (in response to lower popularity scores of segments indicated by the position of the slider 605 on the timeline 625), decrease (in response to higher popularity scores of segments indicated by the position of the slider 605 on the timeline 625), or remain constant (in response to unchanging popularity scores of segments indicated by the position of the slider 605 on the timeline 625). As another example, if the rate of movement of the user input device increases, the rate of movement of the cursor 610 and the slider 605, which the cursor 610 drags, may increase (in response to lower popularity scores of segments indicated by the position of the slider 605 on the timeline 625), decrease (in response to higher popularity scores of segments indicated by the position of the slider 605 on the timeline 625), or remain constant (in response to unchanging popularity scores of segments indicated by the position of the slider 605 on the timeline 625). As another example, if the rate of movement of the user input device decreases, the rate of movement of the cursor 610 and the slider 605, which the cursor 610 drags, may increase (in response to lower popularity scores of segments indicated by the position of the slider 605 on the timeline 625), decrease (in response to higher popularity scores of segments indicated by the position of the slider 605 on the timeline 625), or remain constant (in response to unchanging popularity scores of segments indicated by the position of the slider 605 on the timeline 625). If the segment indicated by the position of the slider 605 is not present in the buffer 180, then the controller 150 changes the position of the slider 605 or the rate of movement of the slider 605 proportional to the rate of movement of the user input device.

Control then continues to block 915 where the controller 150 sets the play position to be the location indicated by the position of the slider 605 on the timeline 625. Control then continues to block 920 where the controller 150 determines whether the frame indicated by the play position is in the buffer 180. If the determination at block 920 is true, then the frame indicated by the play position is present in the buffer 180 at the client computer 100, so control continues to block 925 where the controller 150 plays or displays the frame at the play position from the buffer 180 via the user I/O device 121. If the frame was pre-fetched (or sent) at the time-order resolution, then the controller 150 plays the frame at the time-order resolution. If the frame was pre-fetched (or sent) at the popularity resolution, then the controller 150 plays the frame at the popularity resolution. Control then continues to block 999 where the logic of FIG. 9 returns.

If the determination at block 920 is false, then the frame indicated by the play position is not present in the buffer 180 at the client computer 100, so control continues to block 930 where the logic of FIG. 9 waits for the logic of FIG. 7 to time-order pre-fetch (or send) the frame into the buffer 180. Control then returns to block 920, as previously described above.

In various embodiments, in response to the jump command, the controller 150 displays only the frame at the location indicated by the position where the slider 605 stops moving on the timeline 625, or the controller 150 displays the first frame of every segment indicated by the locations on the timeline 625 over which the slider 605 passes while the controller 150 performs the jump command, or the controller 150 displays a frame every X number of frames, where X is a number inversely proportional to the popularity score of the segments indicated by the locations on the timeline 625 over which the slider 605 passes while the controller 150 performs the jump command. In this way, in an embodiment, the controller 150 displays selected frames from the pre-fetched (or sent) segments, which allows a user to more easily stop at, pause on, or play frames from the segments with higher popularity scores, which are more likely than frames with lower popularity scores to be the frames of interest to the user.

Figure 10:
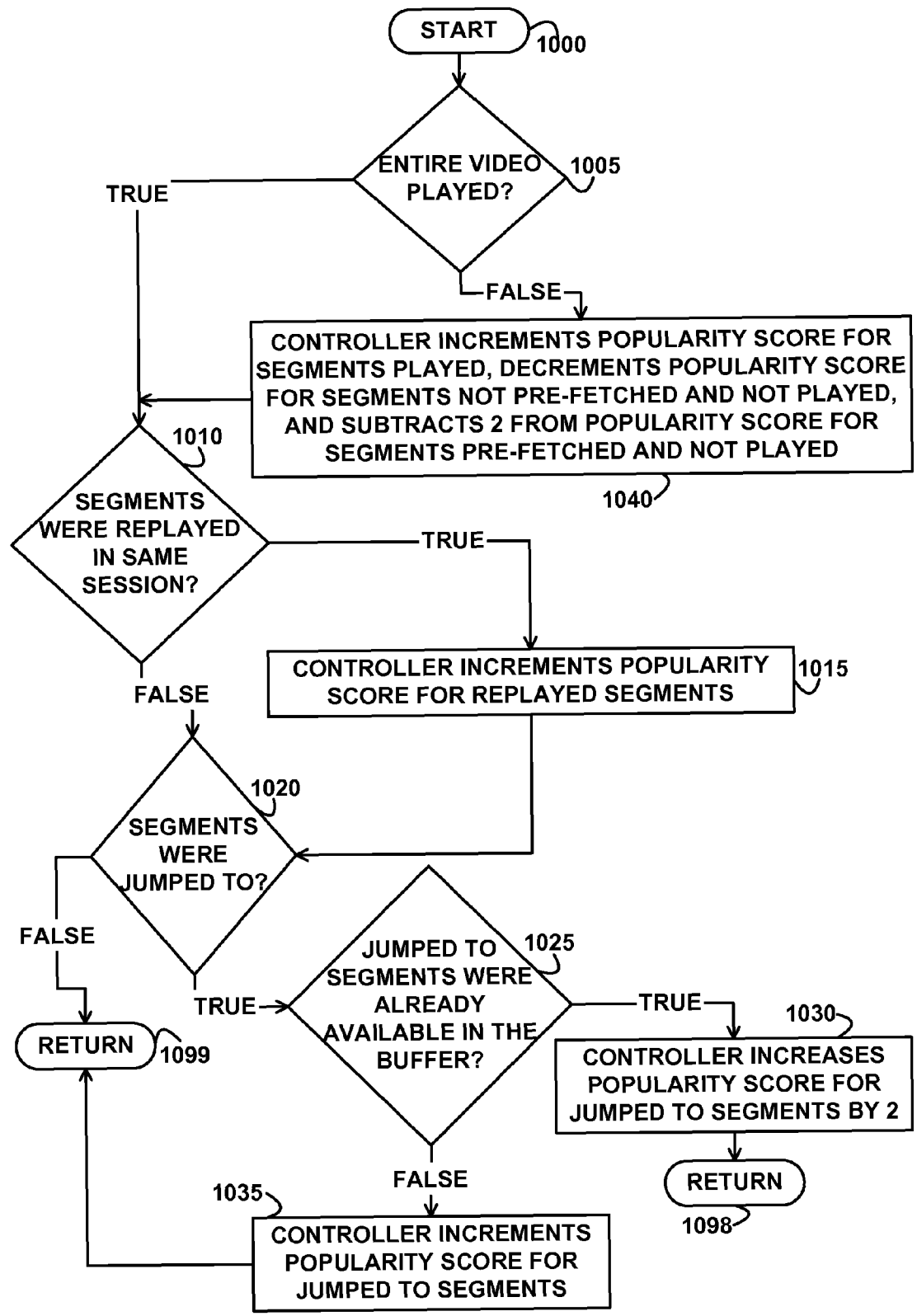
FIG. 10 depicts a flowchart of example processing for calculating popularity scores for video segments, according to an embodiment of the invention.

FIG. 10 depicts a flowchart of example processing for calculating popularity scores for video segments, according to an embodiment of the invention. Control begins at block 1000. Control then continues to block 1005 where the controller 150 determines whether the entire video (all frames and segments) has been played or displayed via the user I/O device 121. If the determination at block 1005 is true, then the entire video has been played, so control continues to block 1010 where the controller 150 determines whether any segments (at least one segment) were replayed in the same session. A session starts in response to the controller 150 receiving an identifier of a video (at block 705 of FIG. 7) and ends when the network connection is terminated or when the controller 150 receives a different identifier of a different video.

If the determination at block 1010 is true, then at least one segment was replayed in the same session, so control continues to block 1015 where the controller 150 increments or increases by some amount the popularity scores for the segments that were replayed in the same session. In an embodiment, the controller 150 increases the popularity scores in proportion to the number of times that the segments were replayed. Control then continues to block 1020 where the controller 150 determines whether any segments were jumped to via a jump, fast forward, or reverse command. If the determination at block 1020 is true, then at least one segment was jumped to via a jump, fast forward, or reverse command, so control continues to block 1025 where the controller 150 determines whether the jumped to segments were already available in the buffer 180. If the determination at block 1025 is true, then the jumped to segments were available in the buffer 180 (had already been pre-fetched (or sent) into the buffer 180) at the time of the jump command, so control continues to block 1030 where the controller 150 increases the popularity score for the jumped to segments by two. In an embodiment, the controller 150 increases the popularity score by any appropriate amount that is greater than the increase of block 1035. Control then continues to block 1098 where the logic of FIG. 10 returns.

If the determination at block 1025 is false, then the jumped to segments were not available in the buffer 180 (had not already been pre-fetched (or sent) into the buffer 180) at the time of the jump command, so control continues to block 1035 where the controller 150 increments or increases the popularity score for the jumped to segments by any appropriate amount that is less than the amount of the increase of block 1030. Control then continues from block 1035 to block 1099 where the logic of FIG. 10 returns.

If the determination at block 1020 is false, then no segments were jumped to during the session, so control continues to block 1099 where the logic of FIG. 10 returns.

If the determination at block 1010 is false, then no segments were replayed in the same session, so control continues to block 1020, as previously described above.

If the determination at block 1005 is false, then the entire video has not been played, so control continues to block 1040 where the controller 150 increments or increases by some amount the popularity score for those segments that were played, decrements or decreases the popularity score for segments not pre-fetched (or sent) and not played, and subtracts two (or any appropriate amount that is greater than the amount by which the logic of block 1040 decreases the popularity score for those segments not pre-fetched (or sent) and not played) from the popularity score for those segments that were pre-fetched (or sent) into the buffer 180 but not played. Control then continues to block 1010, as previously described above.

Figure 11:
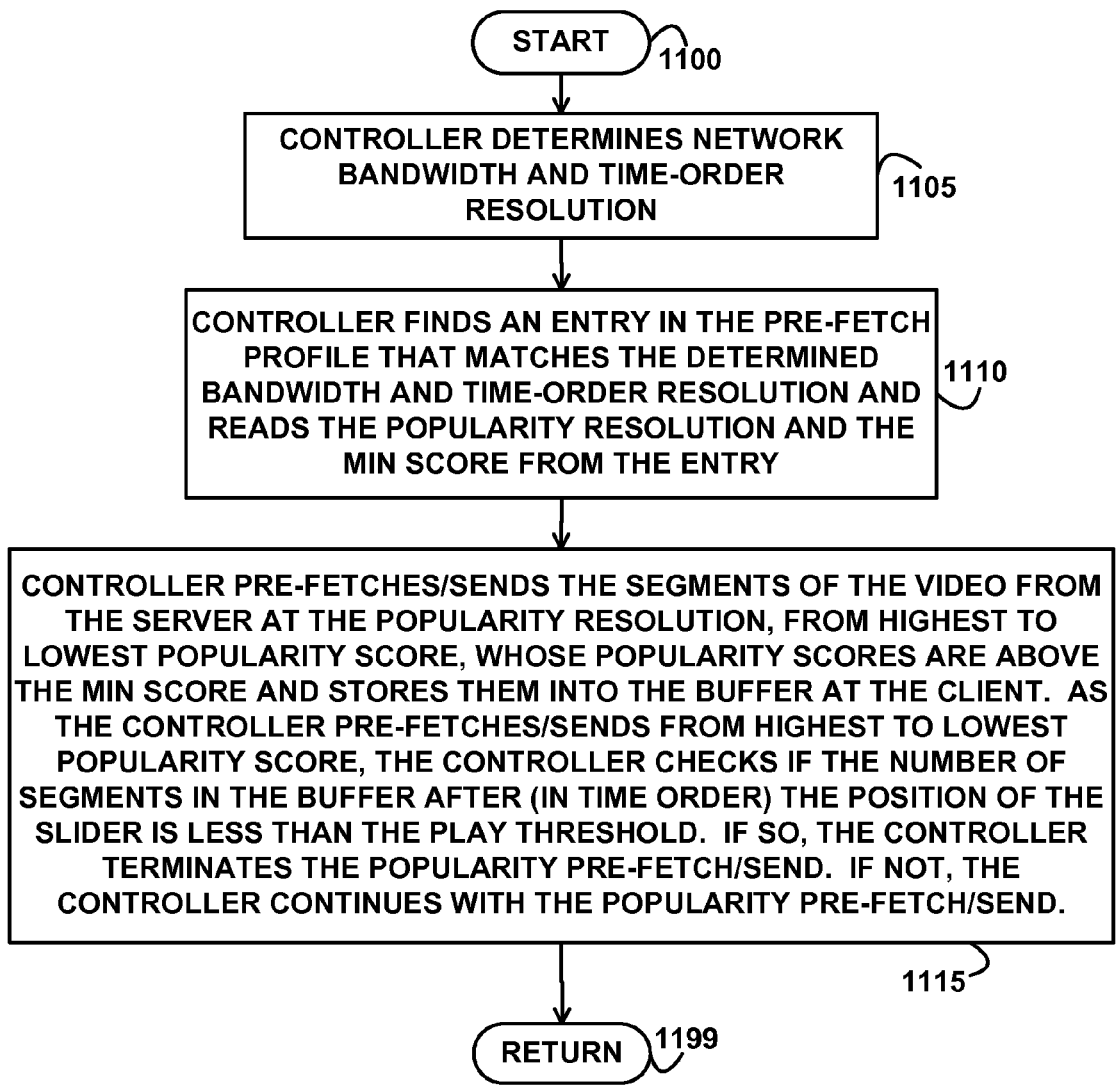
FIG. 11 depicts a flowchart of example processing for pre-fetching (or sending) video segments into a buffer in popularity score order, according to an embodiment of the invention.

FIG. 11 depicts a flowchart of example processing for pre-fetching (or sending) video segments into a buffer in popularity score order, according to an embodiment of the invention. Control begins at block 1100. Control then continues to block 1105 where the controller 150 determines the network bandwidth and the time-order resolution. In an embodiment, the controller 150 reads the network bandwidth from the network interface unit 114, and the network bandwidth is the average performance of data received from the network 130 over a period of time. In an embodiment, the controller 150 receives the time-order resolution from the user via a command or from the server computer 132.

Control then continues to block 1110 where the controller 150 finds an entry in the pre-fetch profile 178 whose network bandwidth field 420 and time-order resolution field 422 match the determined network bandwidth and the determined time-order resolution and reads the values from the popularity resolution field 424 and the minimum popularity score field 426 from the found entry.

Control then continues to block 1115 where the controller 150 pre-fetches (or sends) the segments of the video from the server computer 132 at the popularity resolution 424 indicated by the found entry, from highest to lowest popularity score 322, where the popularity scores 322 of the pre-fetched (or sent) segments are above the minimum popularity score 426 specified by the found entry. The controller 150 stores the pre-fetched (or sent) segments into the buffer 180 at the client computer 100 in time order. Thus, the popularity resolution 424 and the minimum popularity score 426 used by the controller 150 in the pre-fetching (or sending) is dependent on, and determined from, the network bandwidth 420 and the time-order resolution 422.

As the controller 150 pre-fetches (or sends) the segments from highest to lowest popularity score, after each segment, the controller 150 checks if the number of segments in the buffer 180 after (in time order) the position of the slider 605 is less than the play threshold. If the number of segments in the buffer 180 after (in time order) the position of the slider 605 is less than the play threshold, then the controller 150 terminates the popularity pre-fetch (or send) before all of the segments are pre-fetched (or sent). So long as the number of segments in the buffer 180 after (in time order) the position of the slider 605 is greater than or equal to the play threshold and not all of the segments whose popularity score is greater than the minimum popularity score have been pre-fetched (or sent), the controller 150 continues pre-fetching (or sending) the segments in popularity score order, from highest to lowest. Control then continues to block 1199 where the logic of FIG. 11 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
  switching back and forth between time order and popularity order sending of segments of a video based on whether a number of segments of the video in a buffer after a buffer position is less than a play threshold, wherein the switching back and forth between time order and popularity order sending of segments of the video comprises:
  if the number of segments of the video in the buffer after the buffer position is less than the play threshold, sending a first plurality of segments into the buffer in time order;
  if the number of segments of the video in the buffer after the buffer position is not less than the play threshold, sending a second plurality of segments to the buffer in popularity order, wherein the second plurality of segments are stored into the buffer in time order, wherein the sending the second plurality of segments in popularity order further comprises sending the second plurality of segments that have popularity scores that are greater than a minimum popularity threshold score; and
  calculating the popularity scores by decreasing the popularity scores by a first amount for the segments that were not sent and not played and by decreasing the popularity scores by a second amount for the segments that were sent and not played, wherein the second amount is greater than the first amount.

2. The method of claim 1, further comprising:
  changing a rate of movement of a slider inversely proportional to popularity scores of the segments indicated by respective positions of the slider as the slider moves over a timeline, wherein the buffer position is indicated by a position of the slider on the timeline.

3. The method of claim 1,
  wherein the sending the first plurality of segments in time order further comprises sending the first plurality of segments at a time-order resolution; and
  wherein the sending the second plurality of segments in popularity order further comprises sending the second plurality of segments at a popularity resolution, wherein the popularity resolution is different from the time-order resolution.

4. The method of claim 1, further comprising:
  determining the minimum popularity threshold score from a network bandwidth and a time-order resolution at which the segments are sent in the time order.

5. The method of claim 1, wherein the calculating the popularity scores further comprises:
  decreasing the popularity scores by a second amount for the segments that were sent and not played, wherein the second amount is greater than the first amount and by increasing the popularity scores for the segments that were replayed during a same session.

6. The method of claim 5, wherein the calculating the popularity scores further comprises:
   increasing the popularity scores of the segments that were jumped to and already sent into the buffer at a time of a jump command by a third amount; and
   increasing the popularity scores of the segments that were jumped to and not already sent into the buffer at the time of the jump command by a fourth amount, wherein the fourth amount is less than the third amount.

7. A computer-readable non-transitory storage medium encoded with instructions, wherein the instructions when executed comprise:
   switching back and forth between time order and popularity order sending of segments of a video based on whether a number of segments of the video in a buffer after a buffer position is less than a play threshold, wherein the switching back and forth between time order and popularity order sending of segments of the video comprises:
      if the number of segments of the video in the buffer after the buffer position is less than the play threshold, sending a first plurality of segments into the buffer in time order, wherein the sending the first plurality of segments in time order further comprises sending the first plurality of segments at a time-order resolution;
      if the number of segments of the video in the buffer after the buffer position is not less than the play threshold, sending a second plurality of segments to the buffer in popularity order, wherein the second plurality of segments are stored into the buffer in time order, wherein the sending the second plurality of segments in popularity order further comprises sending the second plurality of segments at a popularity resolution, wherein the popularity resolution is different from the time-order resolution, wherein the sending the second plurality of segments in popularity order further comprises sending the second plurality of segments that have popularity scores that are greater than a minimum popularity threshold score; and
      calculating the popularity scores by decreasing the popularity scores by a first amount for the segments that were not sent and not played and by decreasing the popularity scores by a second amount for the segments that were sent and not played, wherein the second amount is greater than the first amount.

8. The computer-readable non-transitory storage medium of claim 7, further comprising:
   changing a rate of movement of a slider inversely proportional to popularity scores of the segments indicated by respective positions of the slider as the slider moves over a timeline, wherein the buffer position is indicated by a position of the slider on the timeline.

9. The computer-readable non-transitory storage medium of claim 7, further comprising:
   determining the minimum popularity threshold score from a network bandwidth and a time-order resolution at which the segments are sent in the time order.

10. The computer-readable non-transitory storage medium of claim 7, wherein the calculating the popularity scores further comprises:
    decreasing the popularity scores by a second amount for the segments that were sent and not played, wherein the second amount is greater than the first amount and by increasing the popularity scores for the segments that were replayed during a same session.

11. The computer-readable non-transitory storage medium of claim 10, wherein the calculating the popularity scores further comprises:
    increasing the popularity scores of the segments that were jumped to and already sent into the buffer at a time of a jump command by a third amount; and
    increasing the popularity scores of the segments that were jumped to and not already sent into the buffer at the time of the jump command by a fourth amount, wherein the fourth amount is less than the third amount.

12. A computer comprising:
    a processor; and
    memory communicatively coupled to the processor, wherein the memory is encoded with instructions, and wherein the instructions when executed by the processor comprise:
    switching back and forth between time order and popularity order sending of segments of a video based on whether a number of segments of the video in a buffer after a buffer position is less than a play threshold, wherein the switching back and forth between time order and popularity order sending of segments of the video comprises:
       if the number of segments of the video in the buffer after the buffer position is less than the play threshold, sending a first plurality of segments into the buffer in time order, wherein the sending the first plurality of segments in time order further comprises sending the first plurality of segments at a time-order resolution, and
       if the number of segments of the video in the buffer after the buffer position is not less than the play threshold, sending a second plurality of segments to the buffer in popularity order, wherein the second plurality of segments are stored into the buffer in time order, wherein the sending the second plurality of segments in popularity order further comprises sending the second plurality of segments at a popularity resolution, wherein the popularity resolution is different from the time-order resolution, wherein the sending the second plurality of segments in popularity order further comprises sending the second plurality of segments that have popularity scores that are greater than a minimum popularity threshold score; and
    calculating the popularity scores by decreasing the popularity scores by a first amount for the segments that were not sent and not played and by decreasing the popularity scores by a second amount for the segments that were sent and not played, wherein the second amount is greater than the first amount.

13. The computer of claim 12, wherein the instructions further comprise:
    changing a rate of movement of a slider inversely proportional to popularity scores of the segments indicated by respective positions of the slider as the slider moves over a timeline, wherein the buffer position is indicated by a position of the slider on the timeline.

14. The computer of claim 12, wherein the instructions further comprise:
    determining the minimum popularity threshold score from a network bandwidth and a time order resolution at which the segments are sent in the time order.

15. The computer of claim 12, wherein the calculating the popularity scores further comprises:

decreasing the popularity scores by a second amount for the segments that were sent and not played, wherein the second amount is greater than the first amount and by increasing the popularity scores for the segments that were replayed during a same session;

increasing the popularity scores of the segments that were jumped to and already sent into the buffer at a time of a jump command by a third amount; and increasing the popularity scores of the segments that were jumped to and not already sent into the buffer at the time of the jump command by a fourth amount, wherein the fourth amount is less than the third amount.

\* \* \* \* \*